(12) United States Patent
Kamikozuru

(10) Patent No.: US 6,889,728 B2
(45) Date of Patent: May 10, 2005

(54) HIGH-SPEED BULK FILLING TANK TRUCK

(75) Inventor: Masayasu Kamikozuru, Kagoshima (JP)

(73) Assignee: Koagas Nihon Co., Ltd., Kagoshima-ken (JP)

( * ) Notice: Subject to any disclaimer, the term of this patent is extended or adjusted under 35 U.S.C. 154(b) by 0 days.

(21) Appl. No.: 10/423,783

(22) Filed: Apr. 25, 2003

(65) Prior Publication Data

US 2004/0007286 A1 Jan. 15, 2004

(30) Foreign Application Priority Data

Apr. 26, 2002 (JP) .................................... 2002-127482

(51) Int. Cl.[7] .................................................. B60P 3/22
(52) U.S. Cl. .......................... 141/231; 141/44; 141/59; 141/290
(58) Field of Search ............................ 141/44, 45, 59, 141/231, 290

(56) References Cited

U.S. PATENT DOCUMENTS 6,408,895 B1 * 6/2002 Beam ........................ 141/59

* cited by examiner

Primary Examiner—J. Casimer Jacyna
(74) Attorney, Agent, or Firm—Akin Gump Strauss Hauer & Feld, LLP

(57) ABSTRACT

A high-speed bulk filling tank truck is provided, which permits reduction of the filling time. The high-speed bulk filling tank truck delivers a liquefied gas in a truck tank to a bulk storage tank, and recovers a gas-phase gas in the bulk storage tank into the truck tank, thereby filling the bulk storage tank with the liquefied gas. The high-speed bulk filling tank truck includes a liquid feed pump, provided on a liquid line through which the liquefied gas flows, for feeding the liquefied gas in the truck tank to the bulk storage tank, and a gas compressor, provided on the gas line through which a gas-phase gas flows, for compressing the gas-phase gas in the bulk storage tank and delivering the same into the truck tank.

5 Claims, 10 Drawing Sheets

HIGH-SPEED BULK FILLING TANK TRUCK

BACKGROUND OF THE INVENTION

The present invention relates to a high-speed bulk filling tank truck for filling a bulk storage tank with a liquefied gas. More particularly, the invention relates to a high-speed bulk filling tank truck permitting reduction of the filling time.

In place of the conventional practice to supply liquefied gas in gas bottles, another practice of direct supply is now becoming more popular, which comprises installing installation-type bulk storage tanks having a large capacity in general houses and plants, and transporting the liquefied gas on small-sized trucks known as tank trucks to directly fill the bulk storage tanks. The tank truck used for filling the liquefied gas has a tank (the "truck tank") for loading the liquefied gas on the chassis of a running vehicle. A filling hose and an equalizing hose are connected to the truck tank via a liquid/gas line, in which devices for liquid such as various valves and meters are arranged. According to this tank truck, the filling hose and the equalizing hose are connected to the bulk storage tank to be filled. The liquefied gas is fed to the bulk storage tank via the filling hose by a liquid feed pump provided on the liquid line, and along with this, the gas-phase gas accumulated in the bulk storage tank is recovered in the truck tank from the equalizing hose through the gas line.

However, the conventional tank truck described above has a problem of a long filling time of the liquefied gas into the bulk storage tank, and there has been a demand for reducing the filling time. The filling operation of the tank truck is carried out by visiting a plurality of houses and plants a day, and a long filling time leads to a lower operating rate. When it is necessary to stop the tank truck on the road near the bulk storage tank to be filled, a long period of stoppage results in the risk of accident.

BRIEF SUMMARY OF THE INVENTION

To solve the aforementioned problem, therefore, it is an object of the present invention to provide a high-speed bulk filling tank truck capable of reducing the filling time.

The high-speed bulk filling tank truck of the present invention, which delivers a liquefied gas in a truck tank to a bulk storage tank, and recovers a gas-phase gas in the bulk storage tank into the truck tank, thereby filling the bulk storage tank with the liquefied gas, comprises a liquid feed pump, provided on a liquid line through which flows the liquefied gas, for feeding the liquefied gas in the truck tank to the bulk storage tank; and a gas compressor, provided on the gas line through which flows a gas-phase gas, for compressing the gas-phase gas in the bulk storage tank and delivering the same into the truck tank.

In the invention, therefore, by simultaneously operating a liquid feed pump and a compressor, the liquefied gas is fed from the truck tank to the bulk storage tank, the gas-phase gas directed from the bulk storage tank being compressed and sent back to the truck tank, and a pressure difference is caused between the truck tank and the bulk storage tank, thereby accomplishing filling. As a result, a power loss of the liquid feed pump is avoided, and the liquefied gas is efficiently sent to the bulk storage tank, thus making it possible to reduce the filling time. It is furthermore possible to fill the bulk storage tank with the liquefied gas by operating the gas compressor alone, and hence to feed the liquefied gas in the truck tank totally to the bulk storage tank.

In the high-speed bulk filling tank truck of the invention, the gas compressor should preferably be arranged on the gas line via a four-way change-over valve which switches over input and output between the truck tank side and the bulk storage tank side.

In the invention, therefore, by switching over input and output of the gas compressor by means of the four-way change-over valve, it is possible not only to fill the liquefied gas, but also to recover the liquefied gas or the gas-phase gas in the bulk storage tank.

The high-speed bulk filling tank truck of the invention further comprises a gas recovery container for recovering gas in joint members for the liquefied gas and the gas-phase gas, the joint members being connected to the gas recovery container; wherein the gas in the joint members is introduced into the gas recovery container having a negative internal pressure for recovery by transferring the gas-phase gas in the gas recovery container by the gas compressor into the truck tank.

According to the invention, therefore, by connecting the joint members of the liquefied gas and the gas-phase gas with the gas recovery container, it is possible to recover the residual gas in the connecting pipe means of the liquefied gas and the gas-phase gas into the gas recovery container. Thus, by cutting off the hoses from the joint members of the liquefied gas and the gas-phase gas after confirming recovery of the liquefied gas and the gas-phase gas into the gas recovery container, the liquefied gas or the gas-phase gas is never released outside.

The high-speed bulk filling tank truck of the present invention further comprises a gas recovery container for recovering gas in joint members for the liquefied gas and the gas-phase gas, the joint members for the liquefied gas being connected to the gas recovery container; wherein the interior of the gas recovery container is pressurized by transferring the gas-phase gas in the truck tank into the gas recovery container by the gas compressor, so that the liquefied gas contained in the recovery container is delivered from the liquefied gas joint members to the truck tank.

According to the invention, therefore, by storing the gas recovered from the joint members of the liquefied gas and the gas-phase gas in the gas recovery container, and by connecting the joint member for the liquefied gas to the inlet piping section of the truck tank upon reaching a certain volume of the liquefied gas, it is possible to feed the liquefied gas recovered into the gas recovery container to the truck tank, and thus to continue gas recovery from the joint members.

The present invention provides also a tank truck for delivering a liquefied gas in a truck tank into a bulk storage tank via a filling hose, and recovering a gas-phase gas in the bulk storage tank into a truck tank via a recovering hose, thereby filling the bulk storage tank with the liquefied gas, having a gas recovery container for recovering the liquefied gas and the gas-phase gas in the filling hose and at the leading end of the recovering hose; wherein the gas-phase gas in the recovery hose and the liquefied gas in the leading end portion of the filling hose are introduced and recovered into the gas recovery container via the recovery hose by connecting the leading end portions of the filling hose connected to the bulk storage tank side and the recovery hose with a shorting hose to cause the leading end portion of the filling hose to communicate with the gas recovery container via the recovery hose, closing a safety stop valve which cuts off the leading end portion of the filling hose on the truck tank side, and reducing the pressure in the gas recovery container to a negative pressure by means of a gas compressor.

According to the invention, therefore, it is possible to recover the gas in the filling hose and the leading end of the recovery hose into the gas recovery container prior to cutting off from the bulk storage tank side. Even when cutting off the filling hose and the recovery hose from the bulk storage tank side thereafter, therefore, the liquefied gas or the gas-phase gas never leaks outside.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
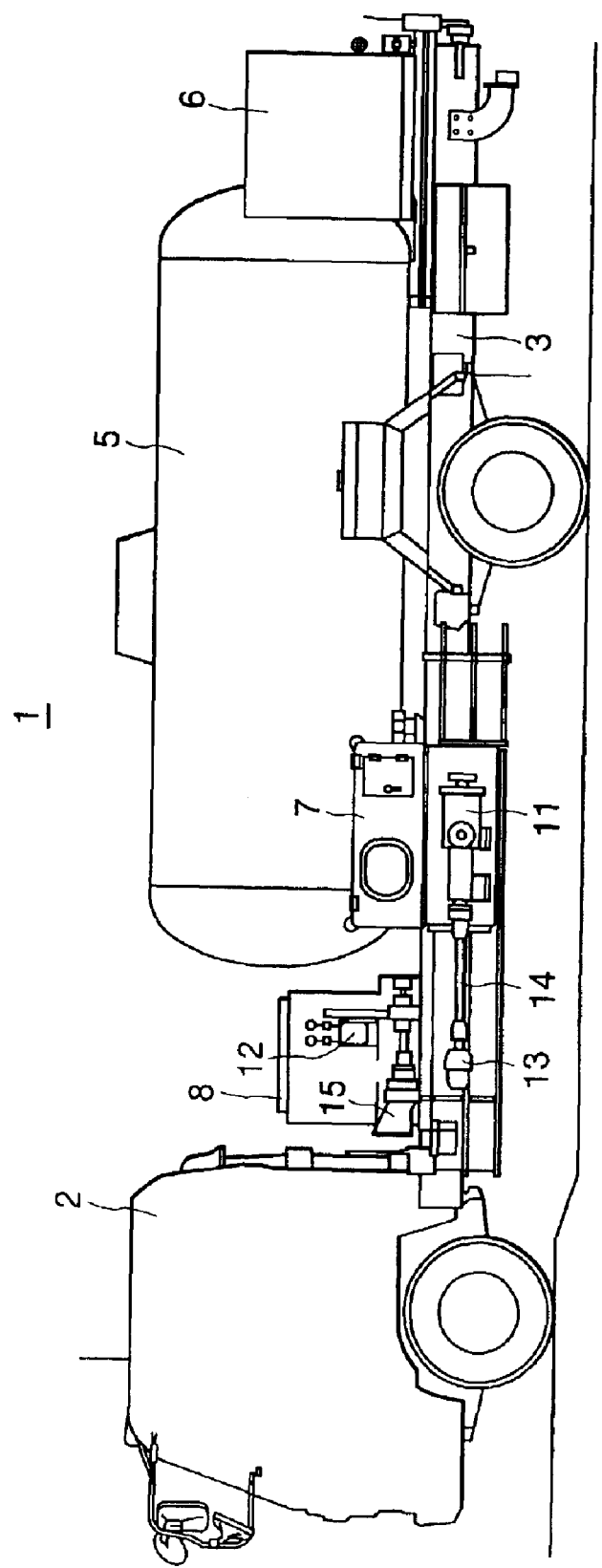
FIG. 1 is a side view showing a partial schematic representation of a first embodiment of a high-speed bulk filling tank truck according to the invention.

Embodiments of the high-speed bulk filling tank truck of the present invention will now be described with reference to the drawings. FIG. 1 is a side view, partial schematic representation of a first embodiment of the high-speed bulk filling tank truck. On the high-speed bulk filling tank truck 1, a truck tank 5 is mounted on a chassis 3 of a running vehicle 2, and the truck tank 5 is connected to various valves and meters, or to a filling hose and a recovery hose housed in a hose reel box 6 on the rear end via liquid feeding means. A fluid circuit having piping, valves and meters fills a bulk storage tank with liquefied gas. The fluid circuit has a liquid line and a gas line for receiving the liquefied gas from a supply terminal into the truck tank 5, and has valves and meters housed in a valve/instrument box 7.

A gas compressor 12 is used in this embodiment in addition to the liquid feed pump 11, on the fluid circuit as described above, as liquid feeding means for filling a bulk storage tank with the liquefied gas in the truck tank 5. The liquid feed pump 11 is arranged under the truck tank 5 as shown in FIG. 1, and the gas compressor 12 is housed and arranged in a compressor box 8 provided in front of the truck tank 5. The liquid feed pump 11 and the gas compressor 12 are of a type which are driven by rotation from a PTO (power takeoff) shaft of an engine. More specifically, the liquid feed pump 11 is driven by engine output derived from a mission side PTO 13, and the mission side PTO 13 and a rotor shaft of the liquid feed pump 11 are connected to each other via a propeller shaft 14.

Figure 2:
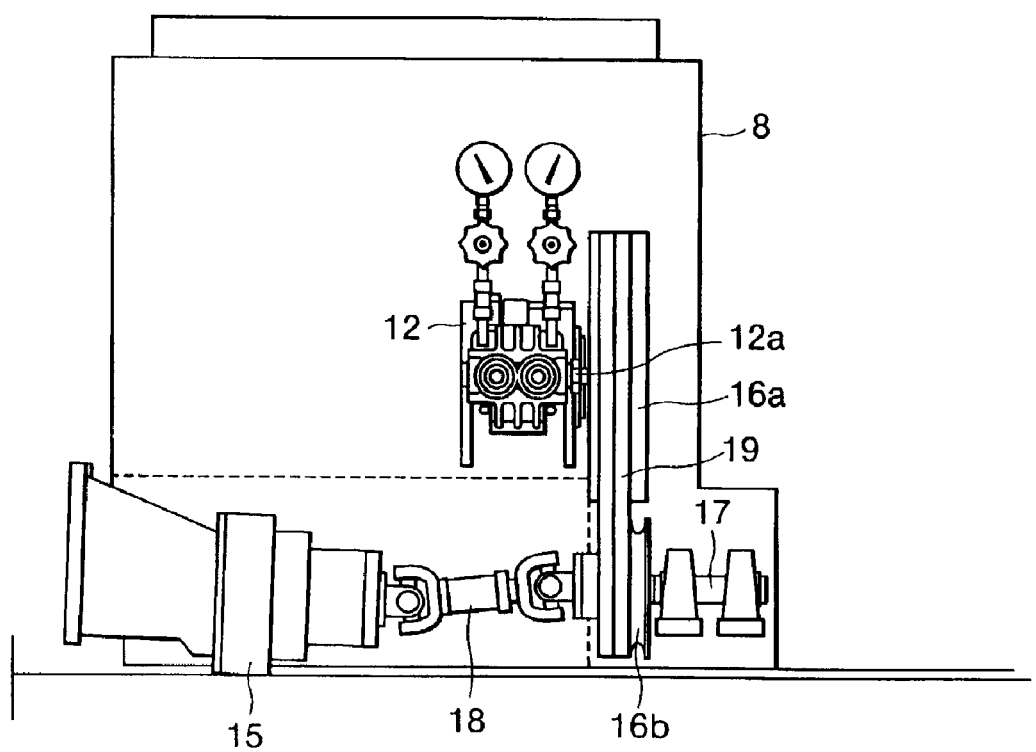
FIG. 2 is an enlarged schematic diagram of the power transmitting mechanism of the gas compressor of the truck shown in FIG. 1.

The gas compressor 12 is driven, on the other hand, by engine output derived from a flywheel PTO 15, and is connected via a pulley to reduce revolutions to a level lower than that of the liquid feed pump 11. FIG. 2 is an enlarged schematic diagram of the power transmitting mechanism of the gas compressor shown in FIG. 1. The gas compressor 12 is of the reciprocation type in which a piston reciprocates as driven by the rotating movement, and has a large-diameter V-pulley 16a fixed to a rotation shaft 12a thereof. A small-diameter V-pulley 16b is secured to a rotation shaft 17 rotatably supported in a compressor box 8, and a V-belt 19 is stretched between these pulleys 16a and 16b. The flywheel FTO 15 is connected to the small-diameter V-pulley 16b via a propeller shaft 18, so as to permit transmission of power to the gas compressor 12 at reduced revolutions.

Figure 3:
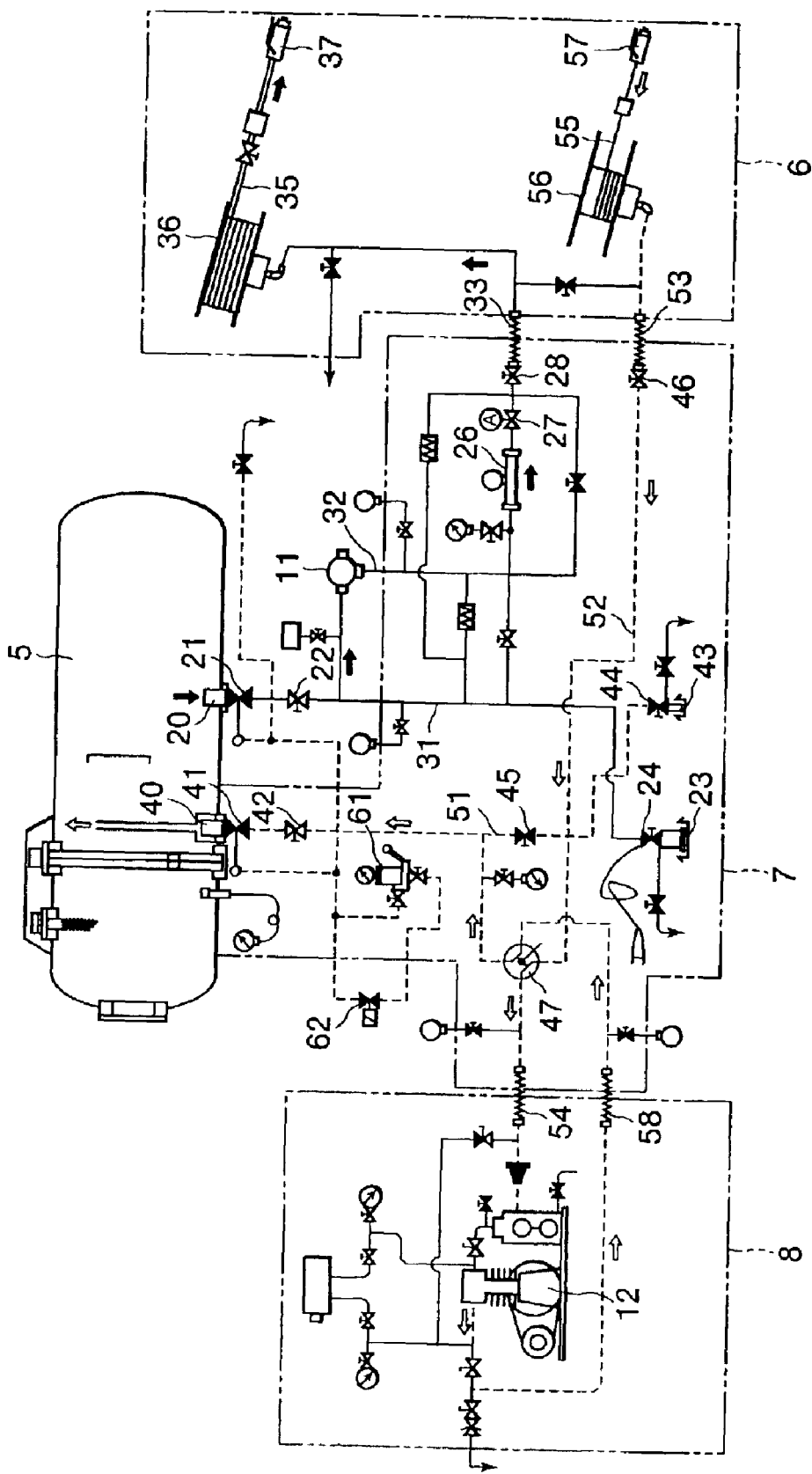
FIG. 3 is a circuit flow diagram illustrating a liquid line and a gas line in one mode of operation of the first embodiment of the high-speed bulk filling tank truck.

FIG. 3 illustrates a fluid circuit comprising component elements, such as the liquid feed pump 11, the gas compressor 12, and various valves and meters, and is a circuit flow diagram showing a liquid line and a gas line in one mode of operation of the high-speed bulk filling tank truck 1. The liquid line and the gas line will now be described.

A liquid port 20 for input and output of the liquefied gas and a gas port 40 for input and output of the gas-phase gas are provided in the bottom surface of the truck tank 5 of the high-speed bulk filling tank truck 1. A liquid line and a gas line capable of being switched over between the supply terminal side and the bulk storage tank side are connected to the liquid port 20 and the gas port 40, respectively.

In the liquid line represented by a thick solid line, an emergency shutoff valve 21 is attached to the liquid port 20. The line branches here to a coupling 23 in the valve/instrument box 7 via a main valve 22 and a filling hose 35 in a hose reel box 6, thus forming a liquid receiving line 31 and a liquid filling line 32, respectively. The coupling 23 in the liquid receiving line 31 is for connecting the liquid hose with the supply terminal (not shown) upon receiving the liquefied gas in the truck tank 5, and is formed integrally with a liquid inlet valve 24. On the other hand, the liquid filling line 32 is piped sequentially to the liquid feed pump 11 for feeding the liquefied gas to the bulk storage tank (not shown), a mass flowmeter 26, a flow stop valve 27, and then to a hose stop valve 28. A flexible tube 33 is used up to the hose reel box 6 (see FIG. 1) distant from the valve/instrument box 7, so that the liquid filling line 32 is connected to the filling hose 35.

In the gas line represented by a thick broken line, an emergency shutoff valve 41 is attached to the gas port 40. The line branches here to a coupling 43 in the valve-instrument box 7 via a main valve 42 and a recovery hose 55 in a hose reel box 6, thus forming a gas return line 51 and a gas recovery line 52, respectively. The coupling 43 of the gas return line 51 is for connecting the gas hose with the supply terminal upon returning the gas-phase gas in the truck tank 5 back to the supply terminal, and is formed integrally with a vent valve 44. The coupling 43 is connected to the main valve 42 via a bypass valve 45 between two points connected to the gas recovery line 51.

On the other hand, the hose stop valve 46 in the valve/instrument box 7 is connected to the recovery hose 55 in the reel hose box 6 via the flexible tube 53 in the gas recovery line 52. The gas compressor 12 and the main valve 42 are connected from the hose stop valve 46 via a four-way change-over valve 47 in the gas recovery line 52. The four-way change-over valve 47 permits switching of input and output of the gas compressor 12 to the truck tank 5 or the bulk storage tank. For the four-way change-over valve 47 and the gas compressor 12, the valve/instrument box 7 and the compressor box 8 are connected by flexible tubes 54 and 58.

The liquid line and the gas line of the high-speed bulk filling tank truck 1 are provided with valves and instruments as shown in FIG. 3, in addition to those described above. Among the valves shown, those represented by outline characters in black with a white background are normally open, and black ones are normally closed.

Modes of operation using the high-speed bulk filling tank truck 1 having the above-mentioned configuration will now be described.

When receiving the supplied liquefied gas at the supply terminal using the high-speed bulk filling tank truck 1, the door of the valve/instrument box 7 is opened by the operator, the liquefied gas feeding hose is connected to the coupling 23 provided there, and the gas hose is connected to the coupling 43, both from the terminal. After connection, the emergency shutoff valves 21 and 41 are opened by the operation of a hand pump 61, and then, the liquid inlet valve 24 and the vent valve 44 are opened. As a result, supply of the liquefied gas from the terminal is started. The liquefied gas fed from the terminal is supplied into the truck tank 5 through the liquid receiving line 31. On the other hand, the gas-phase gas in the truck tank 5 is pressurized along with filling of the liquefied gas, sent from the gas port 40 to the terminal through the gas return line 51, and recovered at the terminal.

The liquefied gas is supplied from the supply terminal to the truck tank 5. When an allowable quantity of the liquefied gas in the truck tank 5 is confirmed to have been reached, an opening signal is sent from a controller (not shown) to a solenoid valve 62. Upon opening solenoid valve 62, the emergency shutoff valves 21 and 41 are released from oil hydraulic pressure and closed. The supply from the terminal to the truck tank 5 is thus discontinued, and the receiving operation is completed. Thereafter, the liquid inlet valve 24 and the vent valve 44 are closed, and the feed hose and the gas hose connected to the terminal are removed, thus achieving a state permitting filling of the bulk storage tank.

Then, the high-speed bulk filling tank truck 1 thus loaded with a liquefied gas visits various locations to fill bulk storage tanks there. In the high-speed bulk filling tank truck 1, stopping at a prescribed position, the door of the hose reel box 6 is opened. The filling hose 35 and the recovery hose 55 housed therein are unwound from the respective hose reels 36 and 56, and the couplings 37 and 57 at the leading ends thereof are connected to a bulk storage tank (not shown). As upon receiving, the emergency shutoff valves 21 and 41 are opened by the operation of the hydraulic hand pump 61 in the valve/instrument box 7, thus completing the preparations for filling the bulk storage tank.

Filling of the liquefied gas is then carried out. In a first mode of operation of this embodiment, the liquefied feed pump 11 and the gas compressor 12 operate simultaneously to feed the liquefied gas in the truck tank 5 to the bulk storage tank (as shown by solid black arrows in FIG. 3). The liquid feed pump 11 is driven by engine output derived from the mission side PTO 13 to feed the liquefied gas in the truck tank 5 to the bulk storage tank. On the other hand, the gas compressor 12 is driven by engine output derived from the flywheel PTO 15, whereby the gas-phase gas in the bulk storage tank is compressed and sent to the truck tank 5 (as shown by white arrows in FIG. 3).

More specifically, the liquefied gas in the truck tank is delivered from the liquid port 20 by driving the liquid feed pump 11, passes through the liquid filling line 32, and fills the bulk storage tank via the flexible tube 33 and the filling hose 35. Simultaneously with this, the gas-phase gas being accumulated in the bulk storage tank is sent from the recovery hose 55 through a flexible tube 53 to the gas recovery line 52. In the gas recovery line 52, the gas-phase gas enters the input side of the gas compressor 12 connected by a four-way change-over valve 47, leaves there from the output side, and is recovered from the gas port 40 into the truck tank 5 again via the four-way change-over valve 47.

In this mode of operation, the liquefied gas is fed from the truck tank 5 to the bulk storage tank by simultaneously operating the liquid feed pump 11 and the gas compressor 12 as described above, and the gas-phase gas derived from the bulk storage tank is compressed and returned to the truck tank 5. This causes a pressure difference between the truck tank 5 and the bulk storage tank by positively sucking the gas-phase gas in the bulk storage tank by means of the gas compressor 12, further compressing the sucked gas-phase gas, and feeding the same to the truck tank 5, thereby achieving high-speed filling by use of the pressure difference.

In studies to reduce the filling time, an object of the present invention, trial and error experiments were performed, including using a bigger filling hose upon conducting equalizing filling, but the desired effect was not achieved. This is attributable to the fact that the flow of the liquefied gas is prevented by piping resistance of the valves, and the internal pressure increased by the gas-phase gas accumulated during the progress of filling of the liquefied gas into the bulk storage tank prevents inflow of the liquefied gas. In this embodiment, therefore, as described above, a pressure difference is created between the truck tank 5 and the bulk storage tank by providing a gas compressor 12 in the gas recovery line 52 of the gas-phase gas, so as to solve the power loss of the liquid feed pump and improve the inflow of the liquefied gas to the bulk storage tank.

As a result, for example in the case of equalizing filling using the liquid feed pump 11, a period of time of 50 minutes is required for filling the liquefied gas in an amount of 1 ton. In the embodiment using the novel gas compressor 12, in contrast, it is now possible to fill 1 ton of liquefied gas in about 35 minutes. According to the high-speed bulk filling tank truck 1 of this embodiment, therefore, it is possible to visit more bulk storage tanks than with the conventional art for filling, thus improving the operability.

In this embodiment, the gas compressor 12 is provided in addition to the liquid feed pump 11 as liquid feeding means. According to this high-speed bulk filling tank truck 1, it is possible not only to carry out filling operation of liquefied gas based on the simultaneous use of the liquid feed pump 11 and the gas compressor 12, but also to conduct various other modes of operations through different manners of management. One such mode of operation is filling of liquefied gas through the gas compressor 12 alone. When filling the liquefied gas by means of the liquid feed pump 11 alone, liquid in an amount of about 100 liters must remain in the truck tank 5 to protect the pump. According to the high-speed tank truck 1, however, operation is possible until the remaining amount of liquefied gas in the truck tank 5 becomes zero while operating only the gas compressor 12. The flow of liquefied gas in this mode of operation is represented by the arrows in FIG. 4, illustrating a circuit flow diagram of the type shown in FIG. 3.

Figure 4:
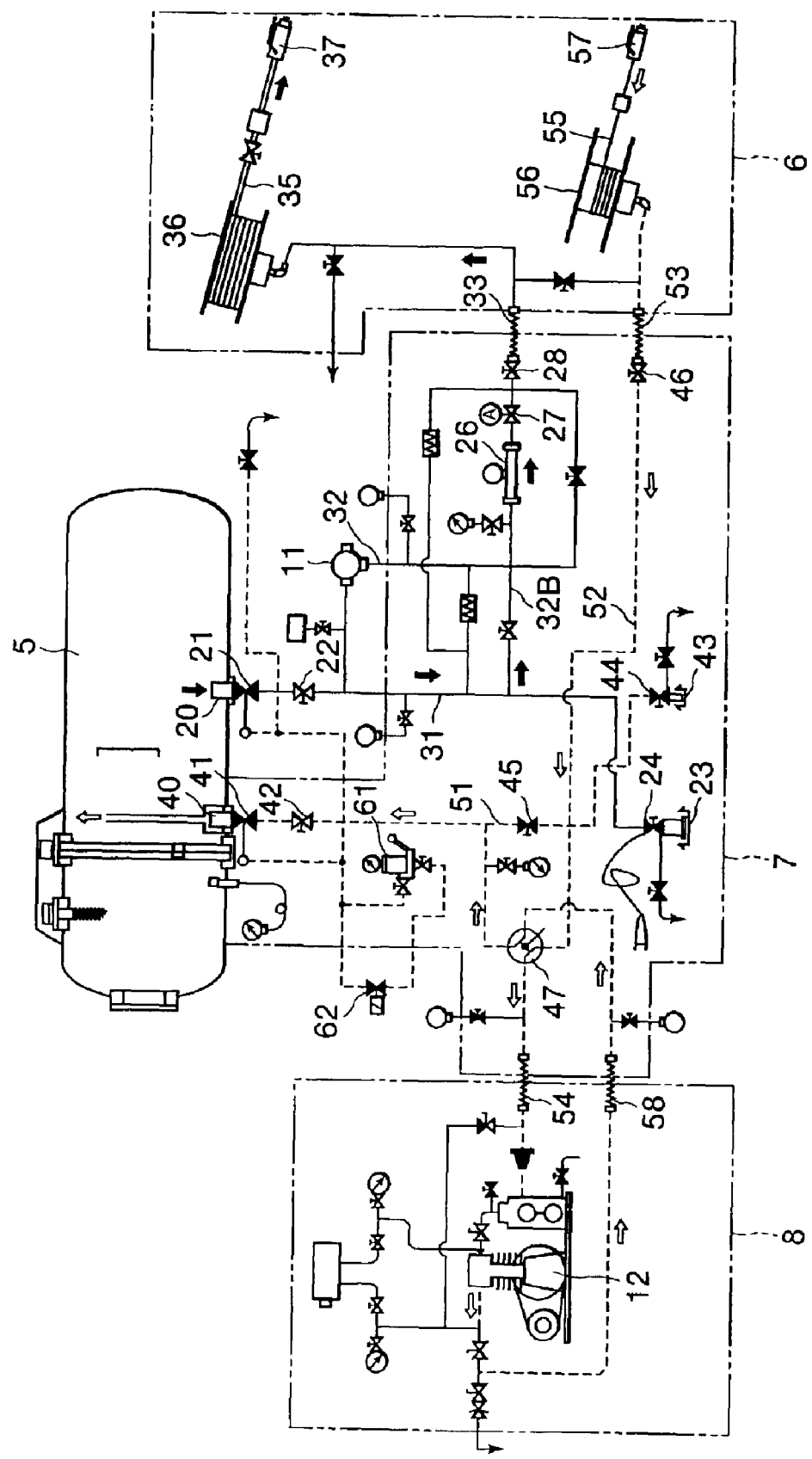
FIG. 4 is a circuit flow diagram illustrating the liquid line and the gas line in a second mode of operation of the first embodiment of the high-speed bulk filling tank truck.

When operating the gas compressor 12 alone while stopping the liquid feed pump 11, the gas-phase gas in the bulk storage tank is sent from the recovery hose 55 via a flexible tube 53 to the gas recovery line 52 (white arrows in FIG. 4). In the gas recovery line 52, the gas-phase gas enters the gas compressor 12 through the input side thereof, connected by the four-way change-over valve 47, and is recovered in the truck tank 5 from the output side thereof through the four-way change-over valve 47 through the gas port 40. At this point in time, the gas-phase gas compressed in the gas compressor 12 is sent into the truck tank 5, producing a pressure difference between the truck tank 5 and the bulk storage tank. As a result, the liquefied gas pressurized in the truck tank 5 is pushed out from the liquid port 20. The liquefied gas thus pushed out flows through a bypass line 32B branching from a liquid inlet line 31 because the liquid feed pump 11 is not operated, and the liquefied gas leaving the valve box 7 is sent into the bulk storage tank via a filling hose 35 from the flexible tube 33 into the bulk storage tank (black arrows in FIG. 4).

Therefore, by simultaneously using the liquid feed pump 11 and the gas compressor 12 as usual operation, and after reaching the driving limit of the liquid feed pump 11, switching over to driving by the gas compressor 12 alone, it is possible to reduce the time for the filling operation, and fully discharge the liquefied gas in the truck tank 5, thus permitting improvement of the efficiency of the filling operation of the high-speed bulk filling tank truck.

Figure 5:
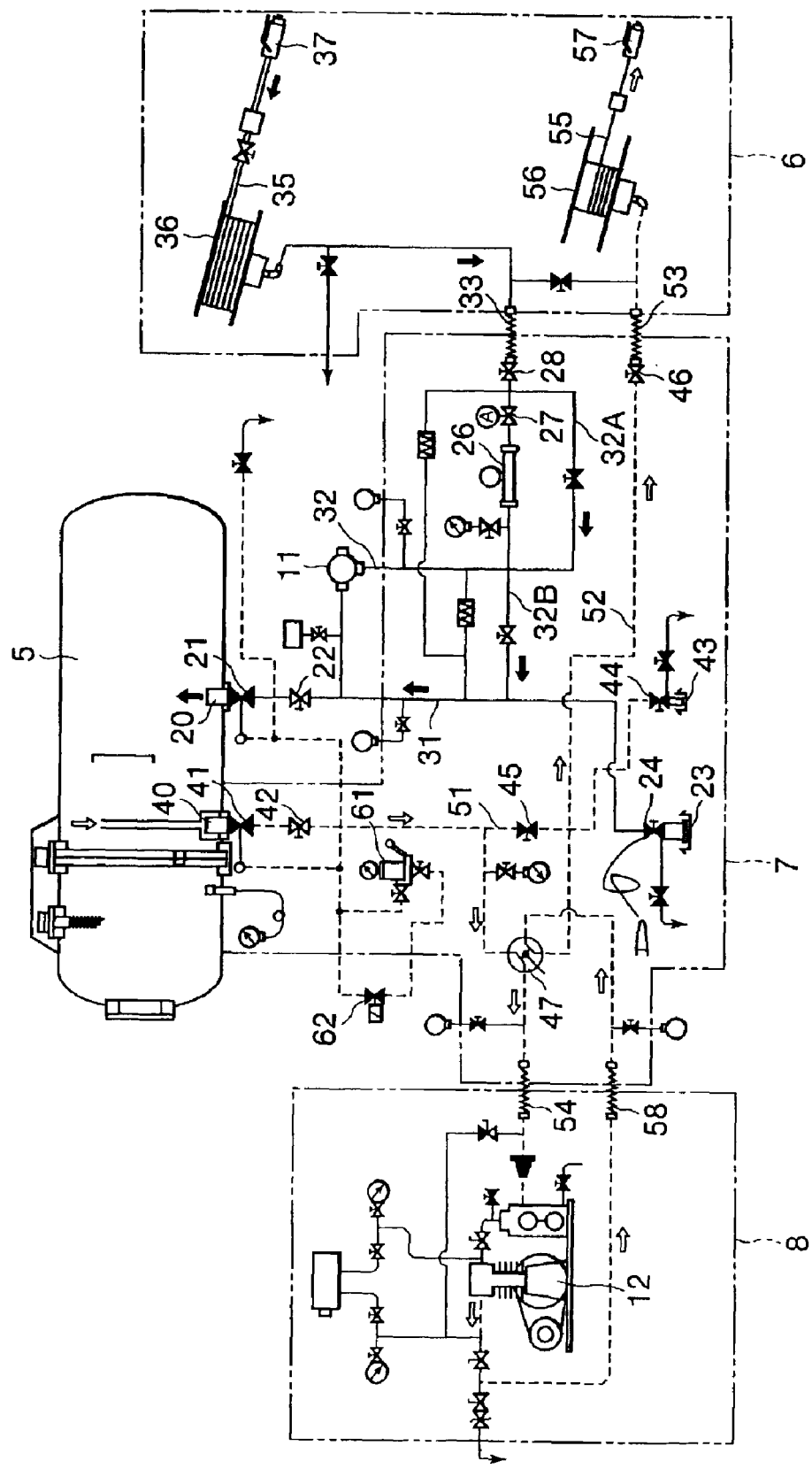
FIG. 5 is a circuit flow diagram illustrating the liquid line and the gas line in a third mode of operation of the first embodiment of the high-speed bulk filling tank truck.

As another advantage, it is possible to recover the liquefied gas. In FIG. 5, the flow of liquefied gas is represented by arrows in a circuit flow diagram similar to that shown in FIG. 3. Recovery of the liquefied gas is accomplished by increasing the internal pressure of the bulk storage tank, thereby returning the liquefied gas in the bulk storage tank back to the truck tank 5, by means of the gas compressor 12 alone. In this case, input/output connection of the gas compressor 12 is switched over by the four-way change-over valve 47 to reverse the flow of the gas-phase gas in the gas recovery line 52.

Therefore, by operating the gas compressor 12 alone while stopping the liquid feed pump 11, the gas-phase gas in the truck tank 5 leaves the gas port 40, passes through the four-way change-over valve 47, is sent to the gas compressor 12, compressed therein, and sent via the gas recovery line 52 through the recovery hose 55 to the bulk storage tank. When the interior of the bulk storage tank is pressurized, a pressure difference is produced between the truck tank 5 and the bulk storage tank. The liquefied gas in the bulk storage tank is thus pushed out, and sent from the filling hose 35, via the bypass lines 32A and 32B and the liquid port 20 into the truck tank 5. According to this mode of operation of the high-speed tank truck 1, as described above, it is also possible to recover the liquefied gas in the bulk storage tank.

Still another mode of operation is the recovery of the gas-phase gas. When operating only the gas compressor 12 as shown in FIG. 4, this manner of operation is carried out in a state in which the filling hose 35 is removed from the bulk storage tank to discontinue filling of the liquefied gas. By operating the gas compressor 12 while stopping the liquid feed pump 11, the gas-phase gas in the bulk storage tank is sucked from the recovery hose 55 via the flexible tube 53 into the gas recovery line 52 (white arrows in FIG. 4). In the gas recovery line 52, the gas-phase gas is fed from the gas port 40 into the truck tank 5 via the gas compressor 12 connected by the four-way change-over valve 47. According to the high-speed bulk filling tank truck 1, therefore, it is possible to recover the gas-phase gas in the bulk storage tank.

According to the high-speed bulk filling tank truck 1 of this embodiment, the mission-side PTO 13 is used for driving the liquid feed pump 11 and the flywheel PTO 15 is used for driving the gas compressor 12, so that direct driving is achieved without using any power medium, such as a hydraulic motor. This permits effective utilization of the driving force and cost reduction, and provides a saving of space resulting from nonuse of a hydraulic motor or the like.

Figure 6:
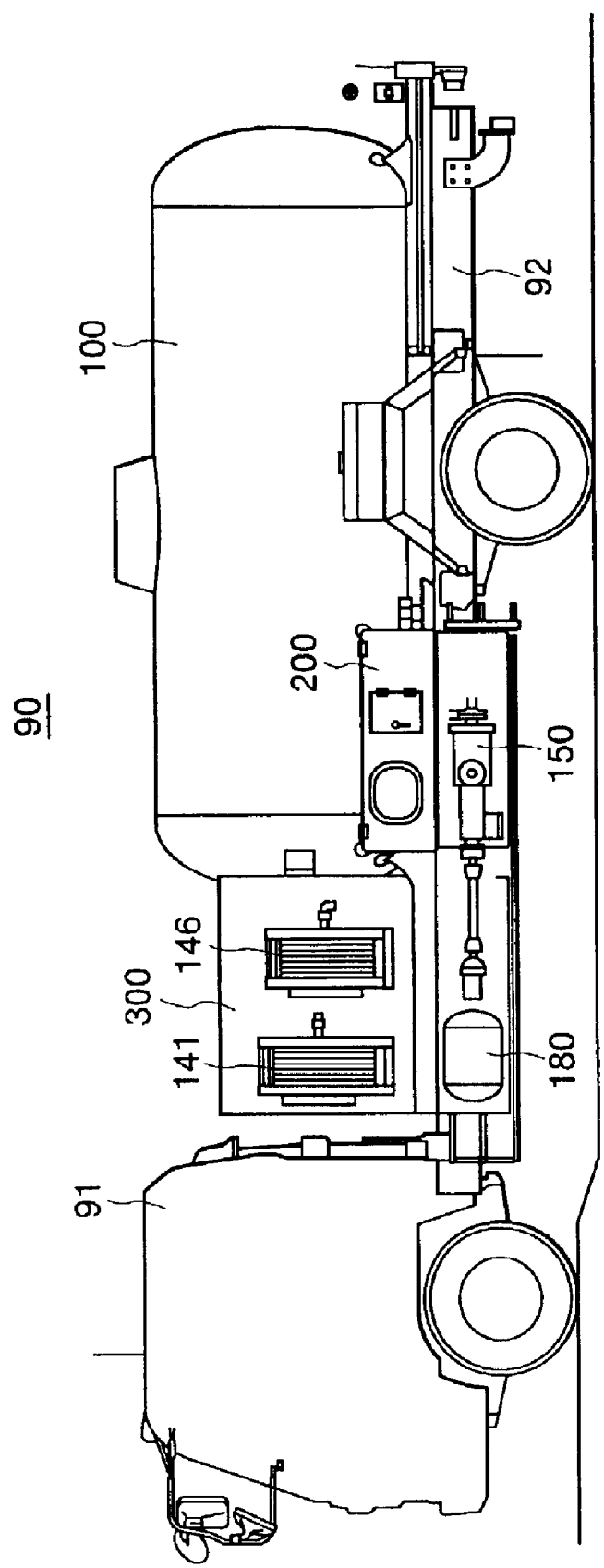
FIG. 6 is a side view showing a partial schematic representation of a second embodiment of the high-speed bulk filling tank truck according to the invention.
Figure 7:
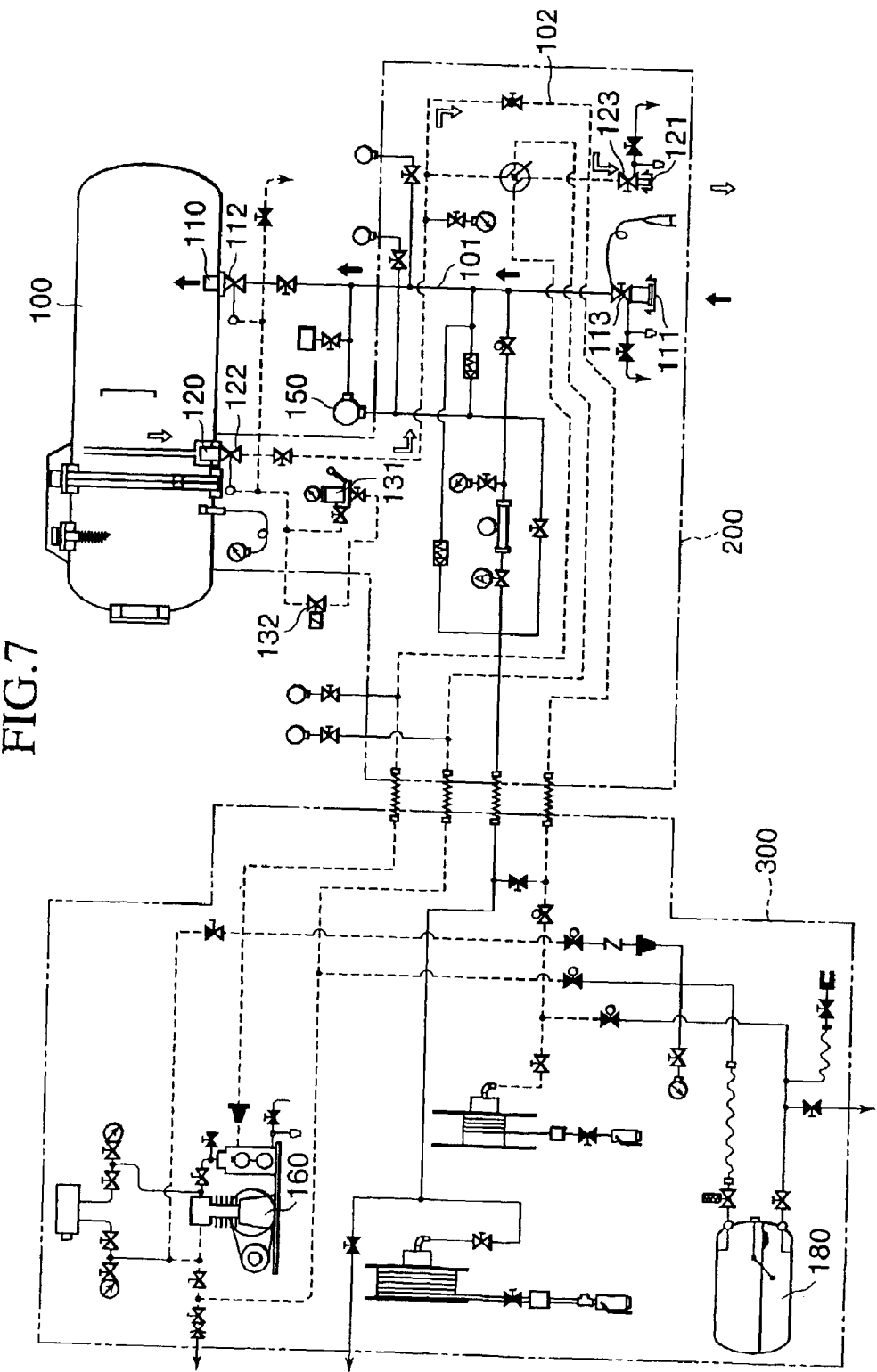
FIG. 7 is a circuit flow diagram illustrating a liquid line and a gas line in a first mode of operation of the second embodiment of the high-speed bulk filling tank truck.

The high-speed bulk filling tank truck of a second embodiment of the invention will now be described. The high-speed bulk filling tank truck of this embodiment makes it possible to fill the gas by simultaneous use of a liquid feed pump and a gas compressor, and prevents leakage or release of gas upon separation by recovering the gas at the joint. FIG. 6 is a side view of a partial schematic representation of the high-speed bulk filling tank truck of the second embodiment.

In this high-speed bulk filling tank truck 90, a truck tank 100 is loaded on a chassis 92 of a running vehicle 91, and the truck tank 100 is connected, via various valves, meters and a liquid feed pump 150, to a filling hose 141 and a recovery hose 146 in a hose reel compressor box 300 in front, or to a gas compressor (not shown but arranged in the depth in the figure. A fluid circuit, in which valves and meters are arranged, fills a bulk storage tank with liquefied gas, and has a liquid line and a gas line for receiving the liquefied gas from a supply terminal into the truck tank 100. Various valves and instruments are housed in a valve-instrument box 200. In this embodiment, furthermore, a gas recovery tank 180 for recovering gas from the leading end valve is housed in the hose reel compressor box 300.

FIGS. 7 to 10 are circuit flow diagrams illustrating the liquid line and the gas line in various steps or modes of operation of the high-speed bulk filling tank truck 90 of this embodiment. The steps from liquid receiving to gas recovery will now be sequentially described with reference to FIGS. 7 to 10.

When the high-speed bulk filling tank truck 90 receives the liquefied gas supplied at the supply terminal (see FIG. 7), a liquefied gas feed hose is connected to a coupling 111 in the valve/instrument box 200, and a gas hose is connected to a coupling 121, respectively, from the terminal. After connection, emergency shutoff valves 112 and 122 are opened by operating a hand pump 131, and then, a liquid inlet valve 113 and a vent valve 123 are opened. As a result, supply of the liquefied gas from the terminal is started. The liquefied gas sent from the terminal is supplied into a truck tank 100 through a liquid port 110 via a liquid receiving line 101. A gas-phase gas in the truck tank 100 is pressurized, delivered through the gas port 120 via a gas return line 102 to the terminal, in which the gas is recovered at the terminal.

In supplying the liquefied gas from the supply terminal to the truck tank 100, as described above, when it is confirmed that an allowable amount of the liquefied gas in the truck tank 100 has been reached, an open signal is sent from a controller (not shown) to a solenoid valve 132. When the solenoid valve 132 is opened, the emergency shutoff valves 112 and 122 are released from oil hydraulic pressure and are closed. As a result, supply from the supply terminal to the truck tank 100 is shut off, thus completing the gas receiving operation. Subsequently, the liquid inlet valve 113 and the vent valve 123 are closed, and the supply hose and the gas hose connected to the terminal are removed. This achieves a state permitting filling of bulk storage tanks.

The high-speed bulk filling tank truck 90, loaded with the liquefied gas as described above, sequentially visits prescribed bulk storage tanks in succession to fill the bulk storage tanks with the liquefied gas. When the high-speed bulk filling tank truck 90 stops at a bulk storage tank, the door of the hose reel compressor box 300 is opened, the filling hose 141 and the recovery hose 146 are unwound from the respective hose reels 142 and 147, and the couplings 143 and 148 at the leading ends thereof are connected to the bulk storage tank (not shown). As upon inlet, the emergency shutoff valves 112 and 122 are opened by acting on the hydraulic hand pump in the valve/instrument box 101, thus completing preparations for filling the bulk storage tank.

Figure 8:
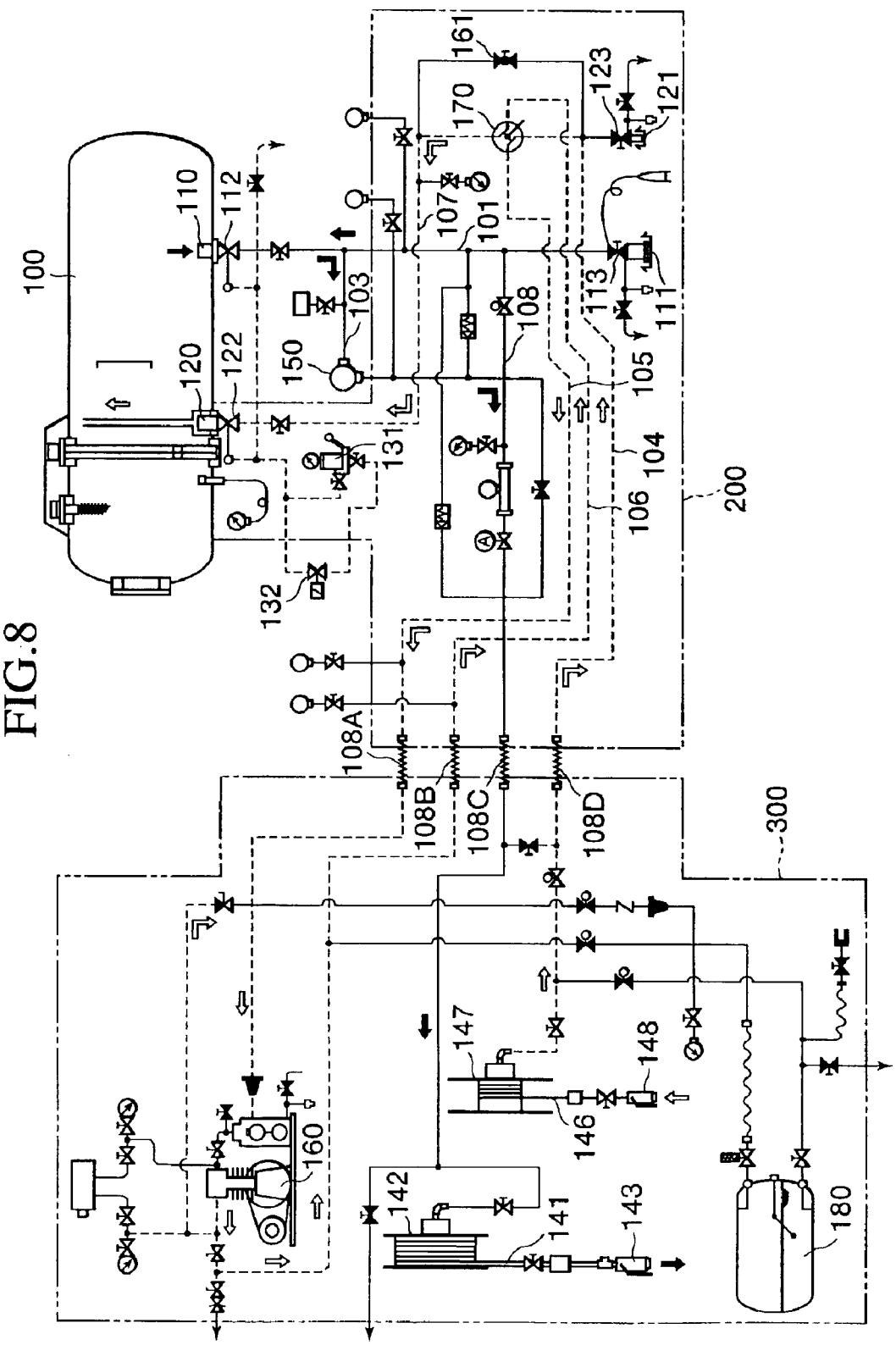
FIG. 8 is a circuit flow diagram illustrating the liquid line and the gas line in a second mode of operation of the second embodiment of the high-speed bulk filling tank truck.

High-speed filling of the liquefied gas, shown in FIG. 8, is then carried out. In high-speed filling, as in the first embodiment, the liquid feed pump 150 and the gas compressor 160 are simultaneously operated so as to feed the liquefied gas in the truck tank 100 into the bulk storage tank (black arrows in FIG. 8). The liquid feed pump 150 is driven by an output derived from an engine, and the liquefied gas in the truck tank 100 is transferred into the bulk storage tank. On the other hand, the gas compressor 160 is also driven by the output derived from the engine. As a result, the gas-phase gas in the bulk storage tank is compressed and sent to the truck tank 100 (white arrows in FIG. 8).

More specifically, the liquefied gas in the truck tank 100 is delivered through the liquid port 110 by operation of the liquid feed pump 150, passes through the liquid filling line 103, and is sent to the bulk storage tank via the flexible tube 108C and the filling hose 141. The gas-phase gas simultaneously accumulated in the bulk storage tank is sent from the recovery hose 146 to the gas recovery line 104 via the flexible tube 108D. In high-speed filling, however, the gas-phase gas is not directly sent to the truck tank 100, but passes through the gas compressor 160. For this purpose, the bypass valve 161 is closed, and the gas recovery line 104 is connected to the gas compression line 105 by the four-way change-over valve 170.

The gas-phase gas sent to the gas compression line 105 is compressed by the gas compressor 160 while it returns back through the flexible tubes 108A and 108B. It flows through the gas compression line 106, and then through the four-way change-over valve 170 again. The gas-phase gas is thus recovered into the truck tank 100 through the gas port 120 from the gas recovery line 107. High-speed filling is made possible, as a result of occurrence of a pressure difference between the truck tank 100 and the bulk storage tank by feeding the liquefied gas from the truck tank 100 into the bulk storage tank, and simultaneously, by positively transferring the gas-phase gas in the bulk storage tank by the gas compressor 160, and furthermore, by compressing the same to send it into the truck tank 100.

Alternatively in this embodiment, on the other hand, the liquefied gas can be filled using the liquid transfer pump 150 alone or the gas compressor 160 alone.

When doing this with the liquid feed pump 150 alone, under the effect of operation of the liquid transfer pump 150, the liquefied gas in the truck tank 100 passes, as shown in FIG. 8, the liquid filling line 103, the flexible tube 108C and the filling hose 141 to the bulk storage tank. Along with the increase in the amount of liquefied gas in the bulk storage tank, the gas-phase gas therein is pushed out to flow from the recovery hose 146 through the flexible tube 108D into the gas recovery line 104. The gas-phase gas having passed through the gas recovery line 104 flows directly to the gas recovery line 107, since the bypass valve 161 is open and the gas compressor 160 is not operated, and is recovered through the gas port 120 into the truck tank 100.

In the case of using the gas compressor 160 alone, operation of the gas compressor 160 causes the gas-phase gas in the bulk storage tank to be sent, as shown in FIG. 8, from the recovery hose 146 through the flexible tube 108D to the gas recovery line 104. Because the bypass valve 161 is closed, the gas-phase gas passes through the four-way change-over valve 170 and the gas compressor, and the pressurized compressed gas is transferred into the truck tank 100. This results in a pressure difference between the truck tank 100 and the bulk storage tank, so that the liquefied gas pressurized in the truck tank 100 is pushed out through the liquid port 110. Since the liquid feed pump 150 is not in operation, the liquefied gas flows through the bypass line 108 branching from the liquid inlet line 101, and flows from the flexible tube 108C to the bulk storage tank via the filling hose 141.

The liquefied gas can also be recovered in this embodiment. This is accomplished by drawing out the gas-phase gas in the truck tank 100 by the gas compressor 160, compressing and transferring the same, and raising the pressure in the bulk storage tank so as to push out the liquefied gas to the truck tank 100.

It is also possible to recover the gas-phase gas. This is accomplished by taking off the filling hose 141 from the bulk storage tank in the state shown in FIG. 8, and operating the gas compressor 160 alone. This sucks the gas-phase gas in the bulk storage tank, and the gas is sent into the truck tank 100 via the gas compressor 160, whereby the gas-phase gas is recovered.

Figure 9:
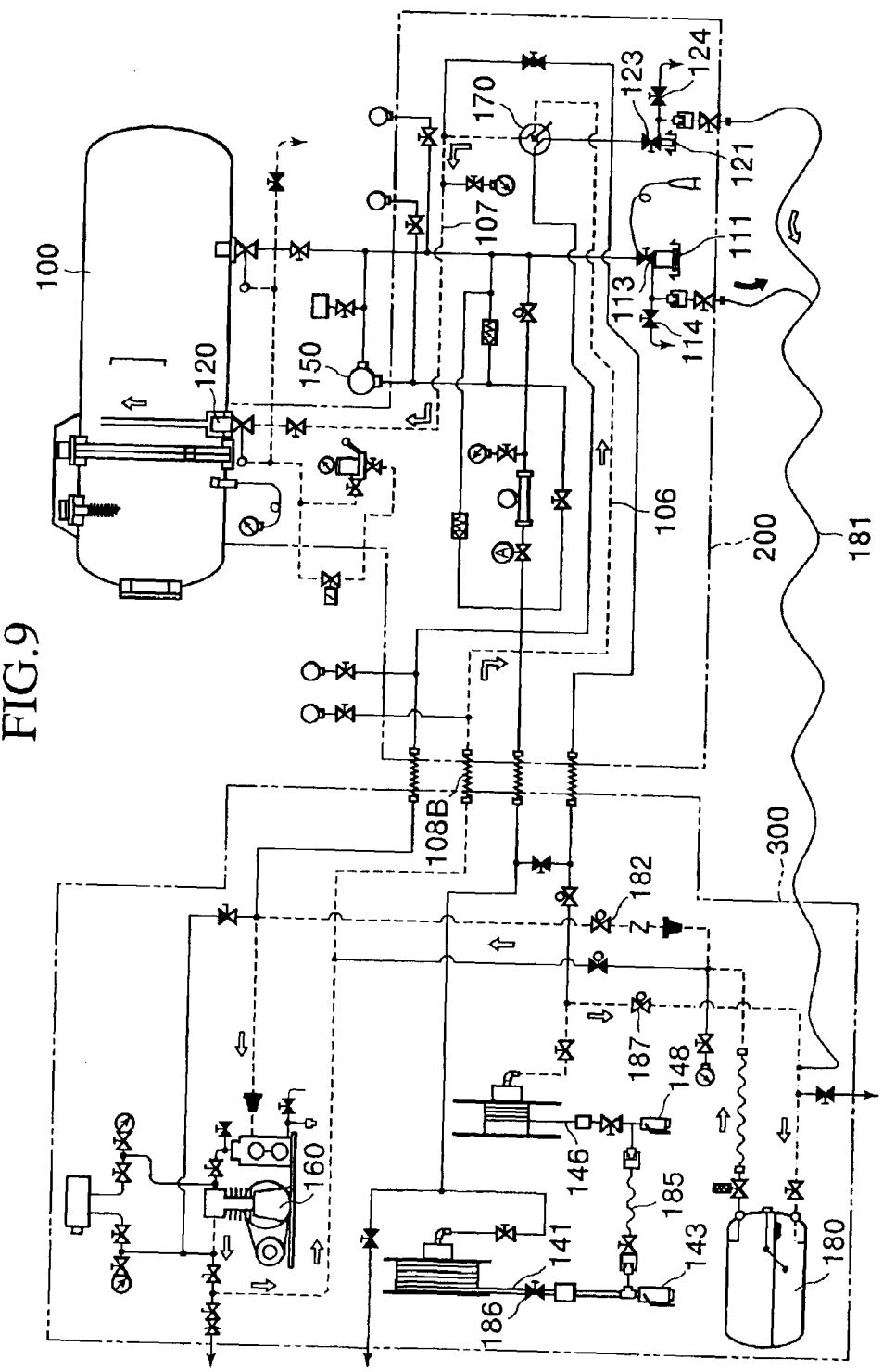
FIG. 9 is a circuit flow diagram illustrating the liquid line and the gas line in a third mode of operation of the second embodiment of the high-speed bulk filling tank truck.

In this embodiment, a gas recovery container 180 is provided so as to permit recovery of gas from the tip valve. FIG. 9 illustrates the circuit upon gas recovery. For example, when a liquefied gas is fed at a supply terminal (FIG. 7), feeding is carried out by connecting the liquefied gas supply hose from the coupling 111 and the gas hose from the coupling 121 in the valve-instrument box 200 to the supply terminal. When taking off the hoses from the couplings 111 and 121 after the completion of supply, the liquid inlet valve 113, the vent valve 123 and the bleeder valves 114 and 124 are closed, and a gas recovery hose 181 is connected in the meantime to communicate with the gas recovery container 180, so as to prevent even the slightest leakage of the liquid or the gas.

Subsequently, the gas recovery valve 182 in the hose reel compressor box 300 is opened to operate the gas compressor 160. Then, the gas-phase gas in the gas recovery container 180 is drawn by the gas compressor 160, passes through the gas compression line 106 and the four-way change-over valve 170 in the compressed state, and is sent from the gas recovery line 107 into the truck tank 100. The interior of the gas recovery container 180 is therefore under a negative pressure, so that the liquefied gas and the gas-phase gas present in the coupling portions 111 and 121, made integral with the liquid inlet valve 113 and the vent valve 123 respectively, are recovered into the gas recovery container 180 through the gas recovery hose 181. Gases are thus non-existent in the coupling portions 111 and 121, and taking off the hoses on the supply terminal never causes leakage of liquid or gas.

When filling the bulk storage tank with the liquefied gas in the truck tank 100, a pressure acts to some extent on the liquefied gas and the gas-phase gas in the filling hose 141 and the recovery hose 146 upon completion of a filling operation. Even when the couplings 143 and 148 are taken off the bulk storage tank in this state, gas leakage hardly occurs because the couplings 143 and 148 are in a so-called "safe" state. A particular smell is imparted to gases, such as propane gas, to attract attention to gas leakage, so that even upon leakage of a slight amount of gas, the release of gas causes spreading of a bad smell over the surroundings. In this embodiment, therefore, gases in the couplings 143 and 148 are recovered so as to prevent leakage even in a slight amount.

For this purpose, the filling hose 141 and the recovery hose 146 are connected with a shorting hose 185 in a state in which the couplings 143 and 148 are connected to the bulk storage tank. After closing a safety stop valve 186 of the filling hose 141, a bypass valve 187 is opened. On the other hand, the interior of the gas recovery container 180 is under a negative pressure because the gas-phase gas therein is drawn by the operated gas compressor 160, as described above. As a result, when the bypass valve 187 is opened, the gas-phase gas in the recovery hose 146 flows into the gas recovery container 180 under the negative pressure. Also, from the filling hose 141 connected with the shorting hose 185, the liquefied gas at the leading end, closed by the safety stop valve 186, flows through the recovery hose 146, is sent into the gas recovery container 180, and is thus recovered. Thereafter, gas leakage to the outside can be completely prevented, even when removing the couplings 143 and 148, since gases in the leading end are completely recovered.

Figure 10:
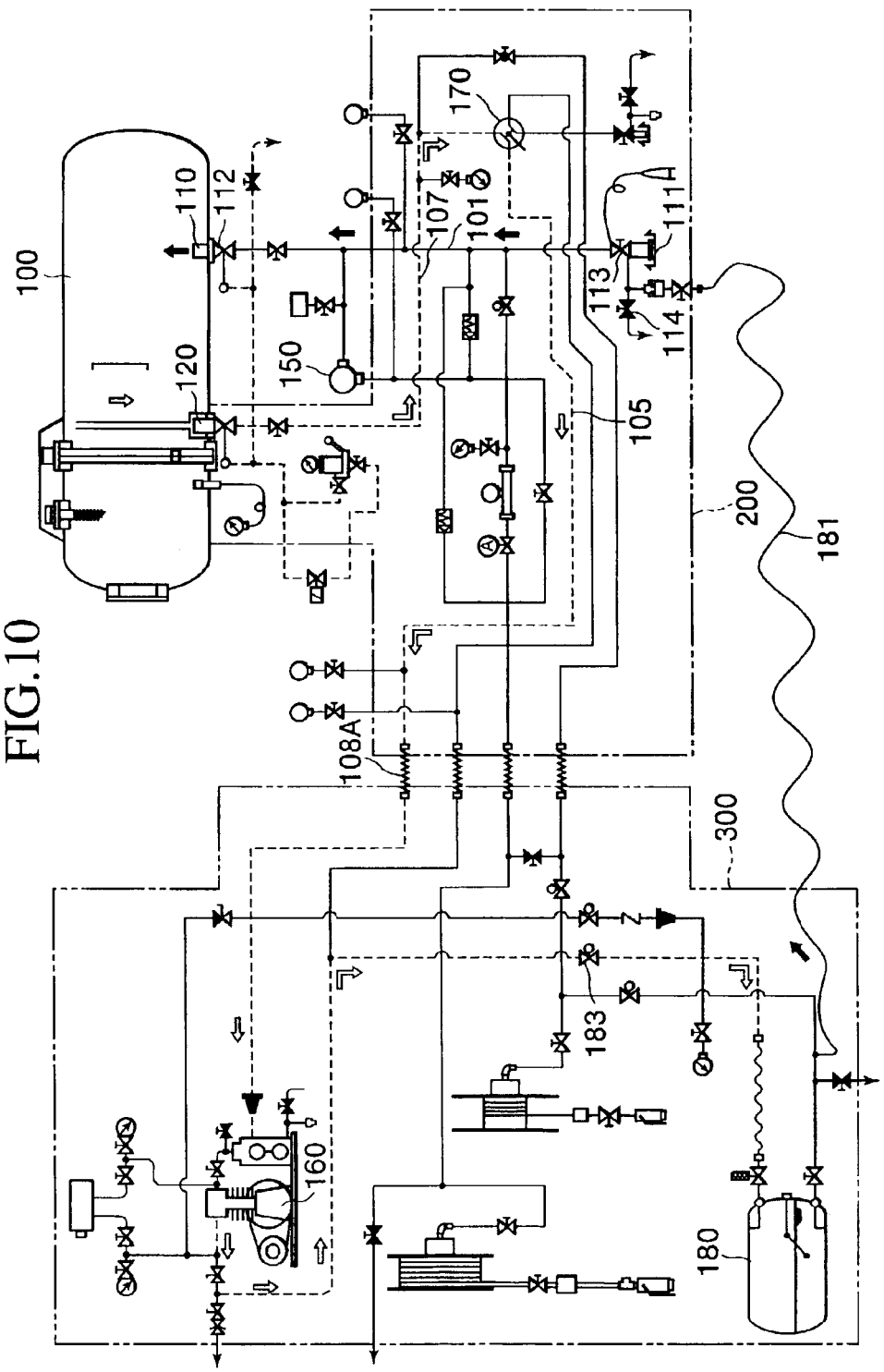
FIG. 10 is a circuit flow diagram illustrating the liquid line and the gas line in a fourth mode of operation of the second embodiment of the high-speed bulk filling tank truck.

The liquefied gas in the gas recovery container 180 thus recovered, on the other hand, can be recovered into the truck tank 100, as shown in FIG. 10. More specifically, by operating the gas compressor 160 by switching the four-way change-over valve 170, the gas-phase gas in the truck tank 100 flows from the four-way change-over valve 170 through the gas compression line 105, is compressed in the gas compressor 160, and transferred into the gas recovery container 180 through the opened gas recovery valve 183. In the gas recovery container 180, supply of the compressed gas-phase gas applies a pressure. As a result, the liquefied gas flows through the gas recovery hose 181, and is recovered into the truck tank 100 via the liquid inlet line 101.

The present invention provides configurations comprising a liquid transfer pump for transferring a liquefied gas in a truck tank to a bulk storage tank on a liquid line through which the liquefied gas flows, and a gas compressor for compressing a gas-phase gas in the bulk storage tank and sending the compressed gas into the truck tank, provided on a gas line through which the gas-phase gas flows. It is therefore possible to provide a high-speed bulk filling tank truck which reduces the filling time.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A high-speed bulk filling tank truck which delivers a liquefied gas in a truck tank to a bulk storage tank, and recovers a gas-phase gas in the bulk storage tank into the truck tank, thereby filling the bulk storage tank with the liquefied gas; comprising:
   a liquid feed pump, provided on a liquid line through which the liquefied gas flows, for feeding the liquefied gas in the truck tank to the bulk storage tank; and
   a gas compressor, provided on the gas line through which a gas-phase gas flows, for compressing the gas-phase gas in the bulk storage tank and delivering the compressed gas into the truck tank, wherein the gas compressor is arranged on the gas line via a four-way change-over valve which switches over input and output between the truck tank side and the bulk storage tank side.

2. The high-speed bulk filling tank truck according to claim 1, further comprising:
   A high-speed bulk filling tank truck which delivers a liquefied gas in a truck tank to a bulk storage tank, and recovers a gas-phase gas in the bulk storage tank into the truck tank, thereby filling the bulk storage tank with the liquefied gas; comprising:
   a liquid feed pump, provided on a liquid line through which the liquefied gas flows, for feeding the liquefied gas in the truck tank to the bulk storage tank;
   a gas compressor, provided on the gas line through which a gas-phase gas flows, for compressing the gas-phase gas in the bulk storage tank and delivering the compressed gas into the truck tank; and
   a gas recovery container for recovering gas in joint members for the liquefied gas and the gas-phase gas, the joint members for the liquefied gas being connected to the gas recovery container;
   wherein an interior of the gas recovery container is pressurized to deliver the liquefied gas contained therein from the liquefied gas joint members to the truck tank by transferring the gas-phase gas in the truck tank into the gas recovery container by the gas compressor.

3. The high-speed bulk filling tank truck according to claim 1, further comprising:
   a gas recovery container for recovering gas in joint members for the liquefied gas and the gas-phase gas, the joint members being connected to the gas recovery container;
   wherein the gas in the joint members is introduced into the gas recovery container having a negative internal pressure for recovery by transferring the gas-phase gas in the gas recovery container into the truck tank by the gas compressor.

4. The high-speed bulk filling tank truck according to claim 1, further comprising:
   a gas recovery container for recovering gas in joint members for the liquefied gas and the gas-phase gas, the joint members for the liquefied gas being connected to the gas recovery container
   wherein an interior of the gas recovery container is pressurized to deliver the liquefied gas contained therein from the liquefied gas joint members to the truck tank by transferring the gas-phase gas in the truck tank into the gas recovery container by the gas compressor.

5. A high-speed bulk filling tank truck which delivers a liquefied gas in a truck tank to a bulk storage tank, and recovers a gas-phase gas in the bulk storage tank into the truck tank, thereby filling the bulk storage tank with the liquefied gas; comprising:

a liquid feed pump, provided on a liquid line through which the liquefied gas flows, for feeding the liquefied gas in the truck tank to the bulk storage tank;

a gas compressor, provided on the gas line through which a gas-phase gas flows, for compressing the gas-phase gas in the bulk storage tank and delivering the compressed gas into the truck tank; and a gas recovery container for recovering gas in joint members for the liquefied gas and the gas-phase gas, the joint members being connected to the gas recovery container;

wherein the gas in the joint members is introduced into the gas recovery container having a negative internal pressure for recovery by transferring the gas-phase gas in the gas recovery container into the truck tank by the gas compressor.

\* \* \* \* \*